US005613216A

United States Patent [19]

Galler

[11] Patent Number: 5,613,216

[45] Date of Patent: Mar. 18, 1997

[54] SELF-CONTAINED VEHICLE PROXIMITY TRIGGERED RESETTABLE TIMER AND MASS TRANSIT RIDER INFORMATION SYSTEM

[76] Inventor: Bernard A. Galler, 1056 Ferdon Rd., Ann Arbor, Mich. 48104

[21] Appl. No.: 445,070

[22] Filed: May 19, 1995

Related U.S. Application Data

[63] Continuation of Ser. No. 141,532, Oct. 27, 1993, abandoned.

[51] Int. Cl.$^6$ .............................. H04B 7/00; G08G 1/123

[52] U.S. Cl. .............................................. 455/66; 340/994

[58] Field of Search ............... 455/66, 57.1; 340/844.17, 340/844.49, 994

[56] References Cited

U.S. PATENT DOCUMENTS 1,999,803 4/1935 Carney .................................... 340/994
3,575,586 4/1971 Kroll .
3,604,898 9/1971 Magnusson .
3,705,976 12/1972 Platzman .
3,846,704 11/1974 Bessette .................................... 455/66
4,212,069 7/1980 Baumann .
4,360,056 11/1982 Simpson et al. .
4,451,158 5/1984 Selwyn et al. .
4,481,723 11/1984 Thorp .
4,493,103 1/1985 Yamashita et al. .
4,501,958 2/1985 Glize et al. .
4,714,925 12/1987 Bartlett .
4,799,162 1/1989 Shinkawa et al. .................. 340/994 X
4,857,925 8/1989 Brubaker ................................ 340/994
4,908,500 3/1990 Baumberger .
4,912,687 3/1990 Treeby .
4,958,064 9/1990 Hedgcoth .
4,977,501 12/1990 Lefevre .
5,006,847 4/1991 Rush et al. .............................. 340/994
5,072,380 12/1991 Randelman .
5,086,389 2/1992 Hassett et al. .
5,144,553 9/1992 Hassett et al. .

FOREIGN PATENT DOCUMENTS 2518444 4/1976 Germany .
4003753 8/1991 Germany .
593387 1/1994 Japan .
9313510 7/1993 WIPO .................................... 340/994
9402923 2/1994 WIPO .................................... 340/994

*Primary Examiner*—Edward F. Urban
*Attorney, Agent, or Firm*—Harness, Dickey & Pierce

[57] ABSTRACT

The vehicle-mounted transmitter unit triggers a reset signal in the stationary receiver unit when the vehicle passes in sufficiently close proximity to the stationary unit. A display connected to the stationary unit tells waiting passengers or riders when to expect the next vehicle to arrive, by presenting either time of day at which last vehicle arrived or elapsed time since last vehicle arrived.

15 Claims, 4 Drawing Sheets

FIGURE 2A
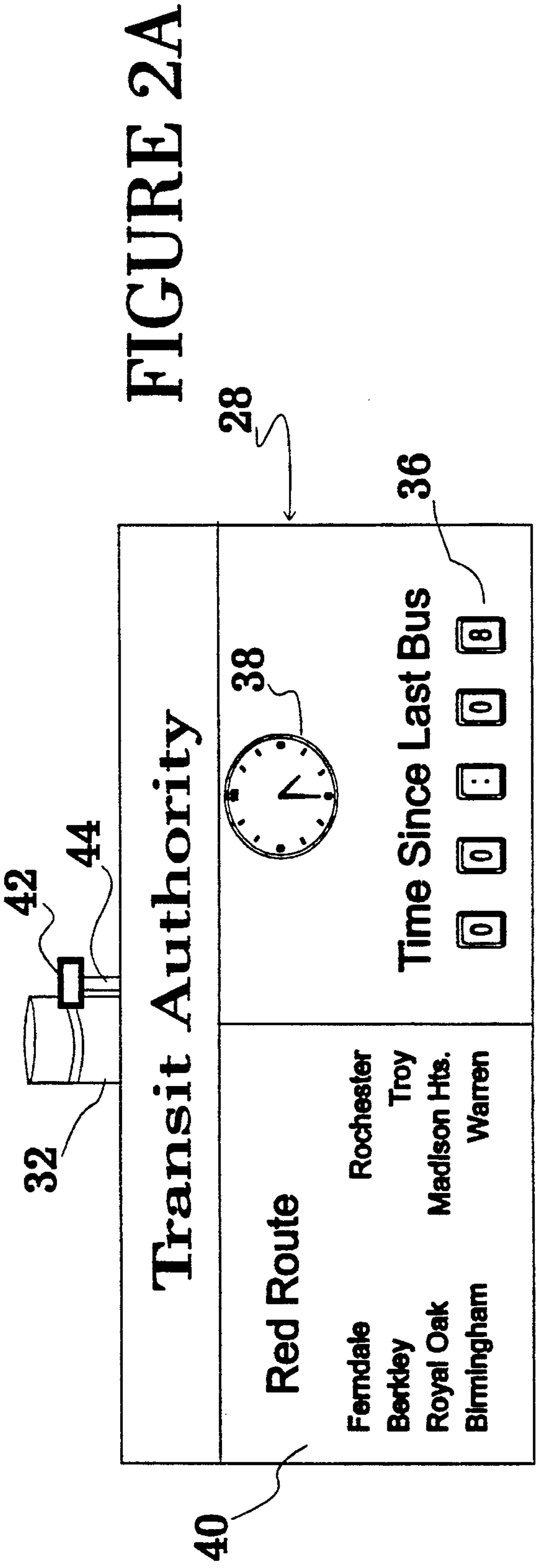
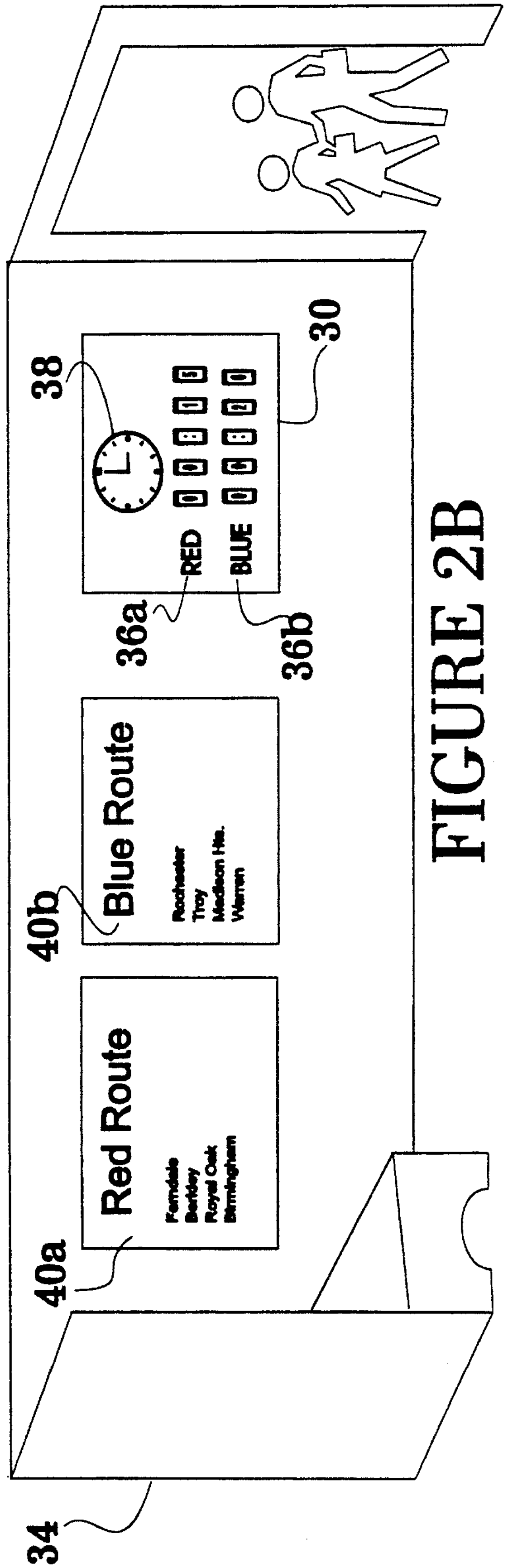
FIGURE 2B

SELF-CONTAINED VEHICLE PROXIMITY TRIGGERED RESETTABLE TIMER AND MASS TRANSIT RIDER INFORMATION SYSTEM

This is a continuation of United States patent application Ser. No. 08/141,532, filed Oct. 27, 1993, entitled "Self-Contained Vehicle Proximity Triggered Resettable Timer and Mass Transit Rider Information System", now abandoned.

BACKGROUND AND SUMMARY OF THE INVENTION

The present invention relates generally to passenger or rider information systems for the mass transportation industry. More particularly, the invention relates to a resettable timer system to allow riders to predict the next arrival time pursuant to listed schedules.

Mass transportation systems, particularly those serving commuter traffic, are becoming increasingly important as energy costs continue to rise and as available parking spaces continue to diminish. For many potential passengers or riders, one of the drawbacks of using mass transportation is the anxiety experienced in possibly just having missed the most recent bus or train, and the related difficulty of not being able to predict when the next bus or train will arrive. From the transit system's standpoint, this problem translates into one of transit system credibility, accurate dynamic information being inherently superior to potentially inaccurate predictions. In addition, it would be desirable for the mass transit system to accurately collect and report vehicle location information dynamically and at low cost.

The present invention addresses these problems using a cost-effective and reliable system which may be readily incorporated in a mass transit system. At each designated stop along each designated route in the transit system a timing device is located, preferably having a digital timer or digital readout capable of showing the number of minutes which have elapsed since the last time a signal arrived to reset the timer to zero, or alternatively, the time of day at which the last signal arrived. The signal may be given by a manual reset button (not available to the public) or by a signal, such as a low power RF transmission from a passing vehicle. If the timer or readout is placed adjacent the printed mass transit schedule, passengers can easily determine how long they will wait until the next scheduled vehicle. If desired, a time of day clock may also be provided for the passenger's convenience.

To accommodate multiple vehicles and multiple routes, each vehicle on a designated route transmits a uniquely coded signal or a signal on a frequency unique to that route. At each multiple-route stop, the stop is provided with a timing device for each route, which is reset only when a vehicle from that route passes the stop.

The system may include a communication mechanism such as telephone line or wireless radio transmission for transmitting the time value being displayed by the timing device to a central station. In this way the central station, or a regional station, can collect data to provide detailed information regarding the timing of all vehicles on all routes in the system.

For a more complete understanding of the invention, its objects and advantages, reference may be had to the following specification and to the accompanying drawings.

BRIEF DESCRIPTION OF THE DRAWINGS

FIGS. 2A and 2B (collectively referred to as FIG. 2) illustrate examples of passenger or rider information kiosks in accordance with the invention, FIG. 2A adapted for a single line stop and FIG. 2B adapted for a multiple line stop;

DESCRIPTION OF THE PREFERRED EMBODIMENT

Figure 1:
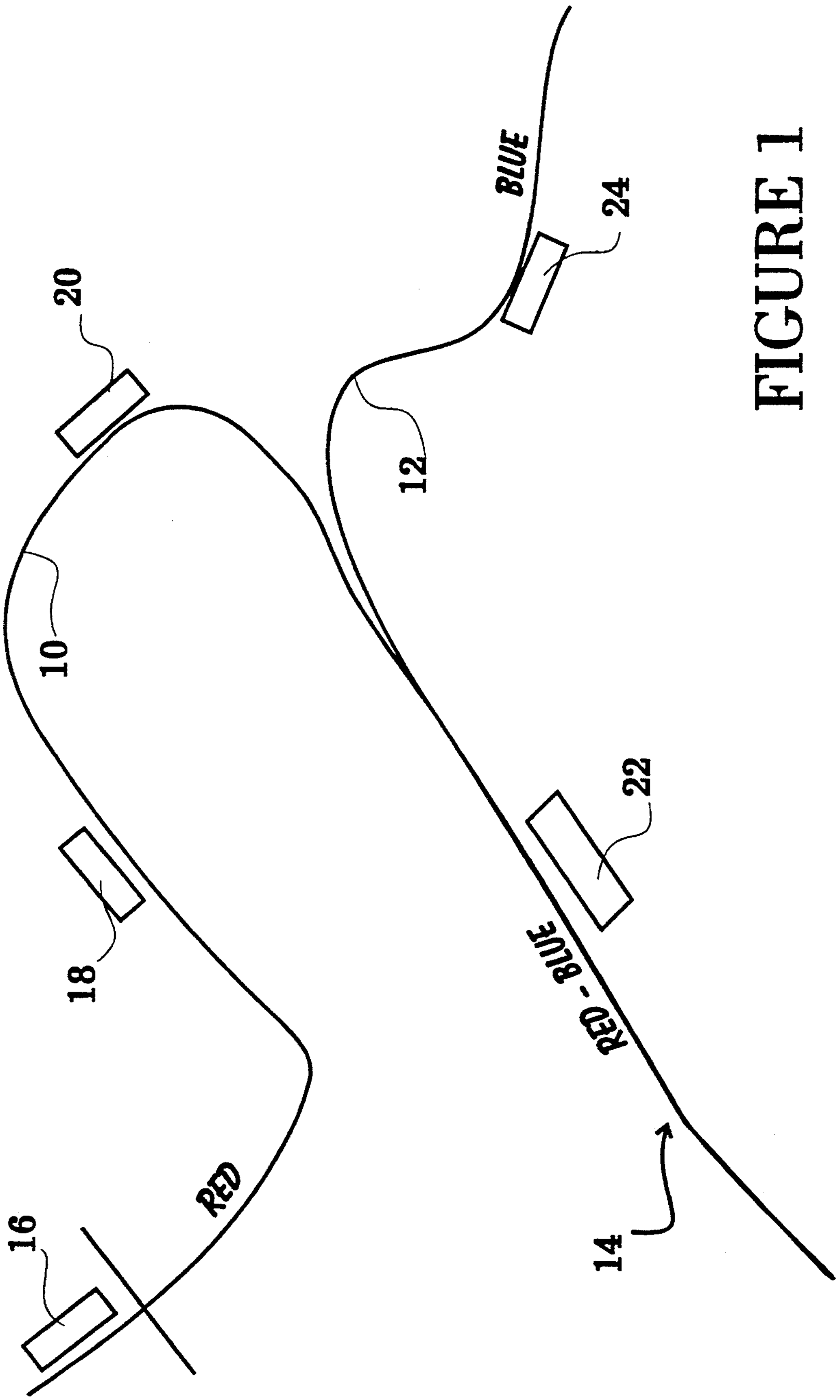
FIG. 1 is an example of a transit system route map useful in illustrating the principles of the invention.

The present invention may be readily adapted to a wide variety of different mass transportation systems which follow a predefined schedule of stops, such as buses, trains, ferries, commuter planes and the like. For purposes of illustrating the invention a bus transit system will be used although illustration of a bus transit system is not intended as a limitation of the invention. Referring to FIG. 1, a simple transit system route map is illustrated showing a first route 10 (also designated the RED route) and a second route 12 (also designated the BLUE route). As illustrated, the first and second routes overlap to share a common roadway as at 14. Each route comprises a plurality of stops designated 16–24. Quite frequently these stops are situated at street intersections or crossroads, as has been illustrated with respect to stop 16.

In the illustrated example of FIG. 1 stop 16, 18 and 20 are used only for the first route 10, the RED line. Similarly, stop 24 is used only for the second route, the BLUE line. Stop 22 is a shared stop, used by both the RED line and the BLUE line. In accordance with the presently preferred embodiment of the invention, located at each stop is a passenger or rider information kiosk or sign. Examples of such are illustrated in FIGS. 2A and 2B of the drawings. In FIG. 2A a single stop kiosk or sign is illustrated at 28. This single stop kiosk or sign would be suitable, for example, at stops 16, 18, 20 and 24. FIG. 2B illustrates a multiple stop kiosk at 30. This multiple stop kiosk would be suitable for use at stop 22, where the BLUE line and RED line share a common stop.

Although the passenger or rider information kiosk can take many forms, one possible form is that of a pole-mounted sign. This has been illustrated in FIG. 2A in which the kiosk is in the form of a sign or placard mounted to a pole 32, as with suitable mounting straps or the like (not shown). Alternatively, the kiosk may form or be incorporated into one of the walls of a passenger or rider shelter where passengers or riders may sit or stand while waiting for the next vehicle. This has been illustrated in FIG. 2B. In FIG. 2B the kiosk sign forms one wall of a covered shelter 34.

A principal objective of the present invention is to reduce rider anxiety over the possibility of having just missed a vehicle and over not being able to predict when the next vehicle will arrive. The present invention addresses this problem by providing at each designated stop along each route in the transit system a device with a digital timer capable of receiving a "reset" signal from a passing (or stopping) vehicle. This device, herein referred to as the stationary unit (SU) retains the time of the last "reset" signal, or alternatively computes the number of minutes which have elapsed since the last time a reset signal arrived, by resetting the timer to zero when the signal arrives.

Accordingly, the passenger or rider information kiosk is provided with a display such as numeric display 36 on which the "last arrival" information is displayed. The last arrival information may consist of the time of day at which the last reset signal was received, or alternatively the number of minutes which have elapsed since the last reset signal was received. In the information kiosk of FIG. 2B two displays 36*a* and 36*b* are illustrated, the former for use with the RED line and the latter for use with the BLUE line. In addition to the last arrival information display the passenger or rider information kiosk is also preferably provided with a time of day display or clock 38. In FIGS. 2A and 2B clock 38 is illustrated as an analog clock in order to visually distinguish it from the last arrival display 36. Of course, clock 38 can also be a digital display, if desired. Also, if desired, the last arrival display 36 could be implemented as an analog clock-style readout. In addition to the last arrival display and the time of day display, the passenger or rider information kiosk may also include a printed schedule for each route serviced by that kiosk. The printed schedule is identified by reference numeral 40 in FIG. 2A and by reference numerals 40*a* and 40*b* in FIG. 2B (depicting the respective schedules for the RED line and BLUE line).

Preferably the electronics for the stationary unit are housed in a tamper-proof case, which may be positioned where it is beyond access by waiting passengers or riders. In FIG. 2A a suitable tamper-proof case 42 is strap-mounted to pole 32, with all necessary display connection wires being installed in conduit 44.

Figure 3:
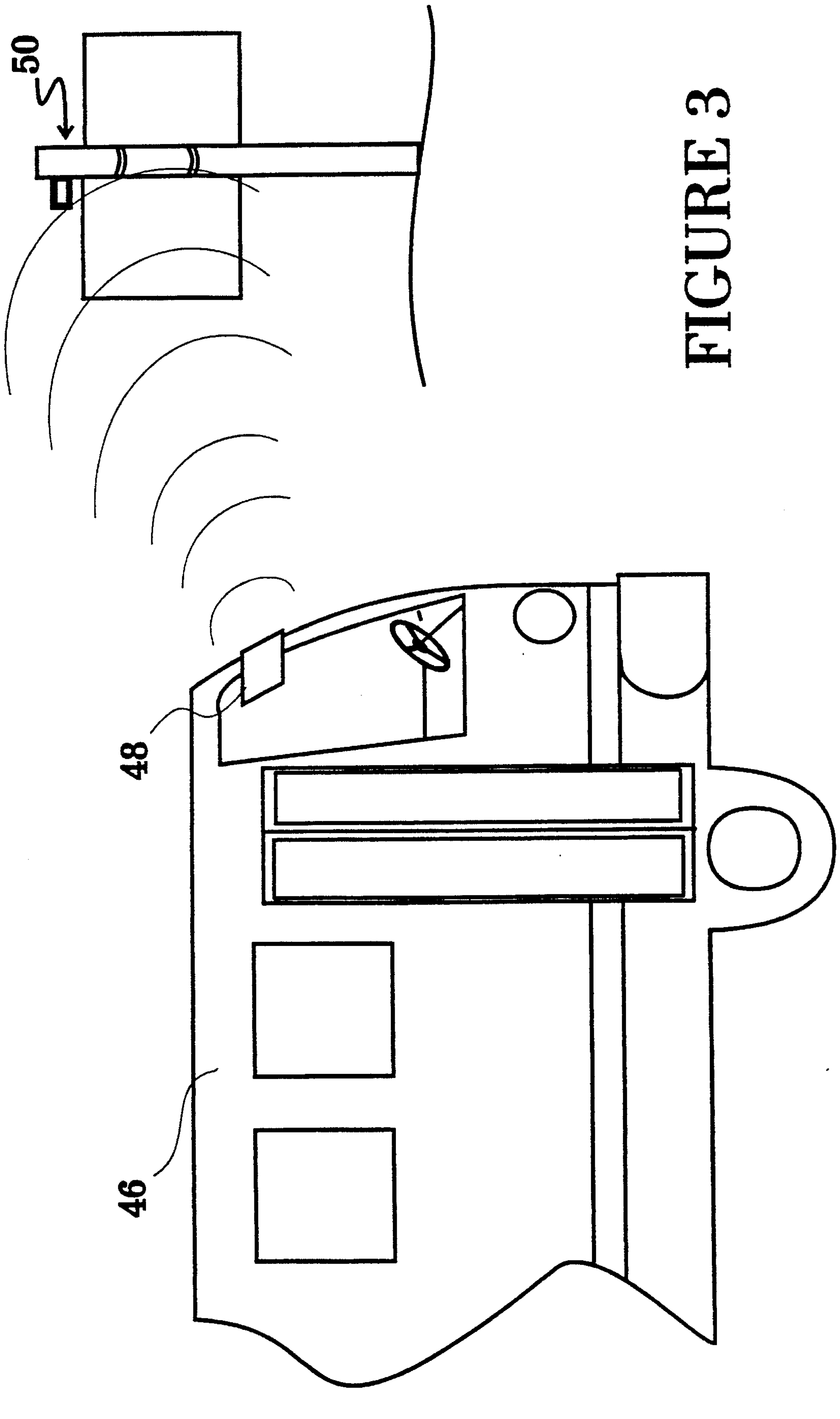
FIG. 3 illustrates possible locations for the stationary unit and the vehicle unit in accordance with the invention.

The reset signal may be given by a manual "reset" button (not available to the public) or preferably by a low power RF transmission or a uniquely coded signal from a passing (or stopping) vehicle. This latter approach is illustrated in FIG. 3, in which vehicle 46 is provided with a vehicle unit 48 (VU) which communicates with the stationary unit (SU) designated generally at 50. Each vehicle on a designated route will transmit its reset signal in a form to distinguish it from the reset signals of vehicles on other routes. This may be accomplished, for example, by using a different unique frequency for each route, or by using some other distinguishing mechanism, such as an appropriate spread spectrum communication facility. The spread spectrum communication facility allows more than one transmission to be received by the stationary unit in a short time period and to decode and thereby recognize the signal as associated with a particular route. If desired, the uniquely coded signal can incorporate the vehicle route and direction of vehicle travel information. The encoded signal can thus be changed automatically by making it interactive with the existing sign or display used on the vehicle to designate its route.

Preferably the transmission from the vehicle unit will be of a controlled power output, so that a vehicle traveling on the opposite side of the roadway, or on a nearby crossroad, will not trip the reset mechanism inadvertently. In other words, the presently preferred RF transmission system employs a controlled power transmitter/receiver link so that the reset signal will trigger the stationary unit only when the vehicle passes or stops in close proximity to the stationary unit. In the case of a multiple route stop, such as stop 22 of FIG. 1, a separate stationary unit, tuned to a separate unique frequency or responsive to a unique digital code, may be provided.

Preferably the vehicle units and stationary units are low power devices suitable for battery operation, if desired. Optionally, the stationary units may be provided with communication circuitry for broadcasting, by telephone line or wireless transmission, the last reset time or the time value being displayed by the device to a central or regional data collection station. In this way detailed information can be maintained on the status of all vehicles on all routes in the system. Furthermore, if desired, two-way communication can be established between the central or regional data collection stations and the stationary units. Also, if desired, the printed schedules may be in the form of an electronic display. Using the two-way communication between the central station and the stationary units, actual transit system data, obtained by the stationary units and broadcast to the central station, can be used to update the schedule being electronically displayed.

Figure 4:
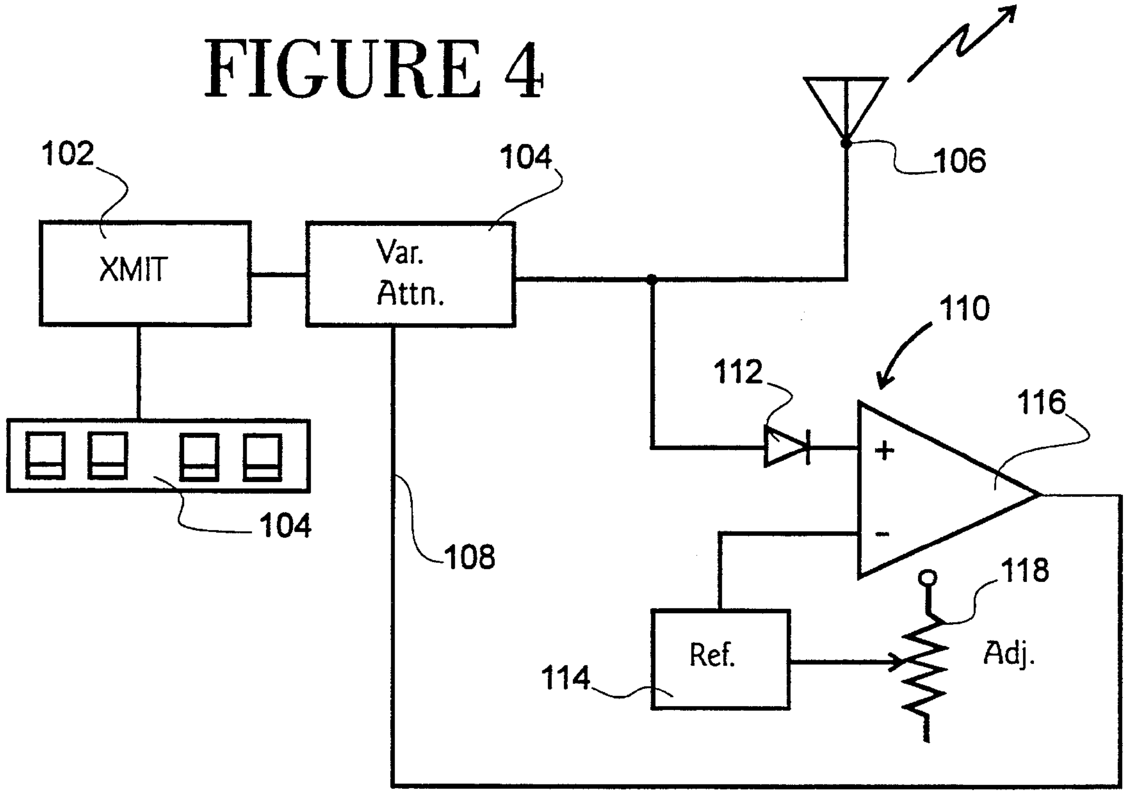
FIG. 4 is a schematic block diagram of a stationary unit.

FIG. 4 illustrates one embodiment of a vehicle unit which employs a coded digital signal to distinguish one route from another and which provides a controlled RF output. The illustrated vehicle unit employs a transmitter circuit 102 which reads a bank 104 of single pole, single throw switches (DIP switches) to provide $2^4$ possible digital codes. The output of transmitter 102 is supplied to attenuator circuit 104, which in turn drives antenna 106. Although other techniques may be employed, the purpose of attenuator circuit 104 is to control the power output delivered to antenna 106 so that vehicles must be sufficiently close to the stationary unit before a trigger signal is responded to. To accomplish this, the attenuator circuit is electrically controlled by a signal on lead 108. A feedback signal is supplied to lead 106 by detector circuit 110. The detector circuit is coupled to the antenna 106 and includes a detector such as diode 112 for obtaining a signal indicative of the amplitude of the RF energy being delivered to the antenna. This signal is compared to a reference level supplied by circuit 114 in a comparator 116. The output of comparator 116 supplies the feedback signal to lead 108. Preferably the reference signal may be adjusted to calibrate the system. An adjustment potentiometer 118 is supplied for this purpose.

Figure 5:
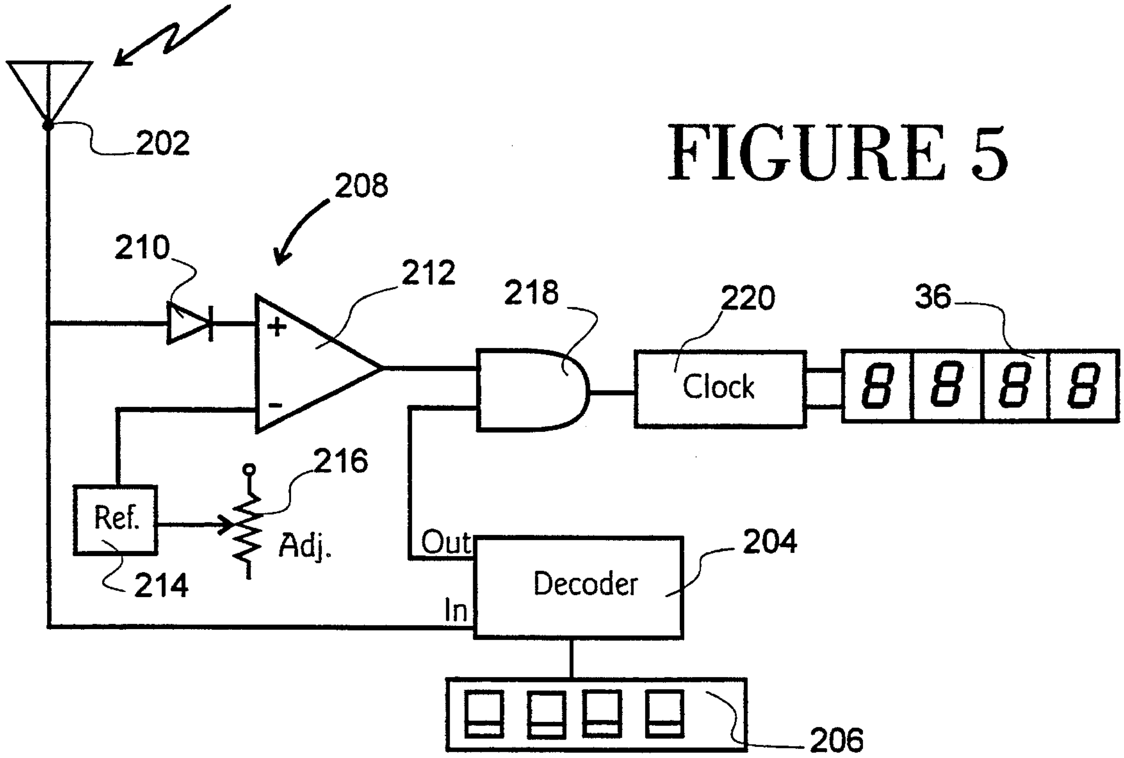
FIG. 5 is a block diagram of a vehicle unit.

Referring to FIG. 5, one embodiment of a receiver circuit is illustrated for use by the stationary unit. The circuit includes antenna 202 for receiving signals broadcast by antenna 106 of the vehicle unit. Antenna 202 is coupled to a decoder circuit 204 which also includes a switch bank 206 of single pole, single throw (DIP) switches used to set the code to which the decoder will respond. If desired, a threshold detection circuit 208 can be used to prevent false triggering by signals which are below a predetermined RF level. Although a variety of different techniques may be used, the circuit illustrated in FIG. 5 derives a signal through diode 210 representing the amplitude of the RF energy received by antenna 202. This signal is applied to a comparator 212 which also receives a reference signal from reference circuit 214. The reference circuit can include an adjustment potentiometer 16 for setting the reference level during calibration. The output of comparator 212 may be fed to one input of a logic gate such as AND gate 218. The output of decoder 204 is also fed to the input of AND gate 218. AND gate 218 produces a signal to reset clock circuit 220 when the decoder circuit 204 detects the presence of a properly encoded signal and when the threshold circuit simultaneously verifies that the RF signal received is of sufficient level, indicating that the vehicle is within a predetermined proximity to the stationary unit. The output of clock circuit 220 is supplied to the display 36.

In addition to the above-described circuitry for limiting the electromagnetic energy radiated by the transmitter and the threshold detection circuitry used in the receiver, one or both of the antennas can be directional antennas to further limit false triggering.

Depending on the desired performance, the clock circuit 220 can take several forms. In one form the clock circuit has a count up mechanism which is reset to zero by the reset signal and which counts up in minutes thereafter. This type of count up circuit has the advantage of being able to provide a direct readout of the number of minutes which have elapsed since the last vehicle arrived at the stop. The count up circuit is preferred over a count down circuit, since the count down circuit must be supplied with a known value (the number of minutes until the next vehicle is expected to arrive). This known value may be different for different vehicles, making the circuitry more complex. Moreover, counting down from a known value presents a problem once zero is reached. Unless the count down circuit extends into negative numbers, the passenger or rider is unable to discern how late the vehicle is once zero is reached.

As an alternative to the count up mechanism, the clock circuit may be configured to include a time of day clock and a mechanism for capturing and storing a time of day value in response to the reset signal. In such an embodiment the time of day value captured upon receipt of the reset signal would be available for display to the passenger or rider as an indication of the actual arrival time of the last vehicle to arrive.

In operation, as the vehicles traverse the predefined route and thereby pass in proximity to the stationary units, a reset signal, broadcast by the vehicle unit, is picked up by the stationary unit thereby automatically (a) reading the current time of day and capturing that reading in memory for display or alternatively (b) resetting a counter to zero, the counter thus serving to automatically count the number of minutes elapsed since the reset signal was received. In the former case a passenger or rider waiting at a stop can read the time of day at which the last vehicle passed by, compare that reading with the current time of day shown on the clock to thereby compute his or her own estimate of when the next vehicle will arrive, based on the posted schedule. In the latter case, the passenger or rider reads the amount of time since the last vehicle passed by and is thus able to deduce an estimate of when the next vehicle will arrive, based on the elapsed time and the posted schedule, using the clock if needed.

While the invention can be practiced in many forms, it has been illustrated and described in connection with the presently preferred embodiment. It will therefore be understood that the preferred embodiment is merely illustrative of the principles of the invention and that the invention is capable of certain modification and change without departing from the spirit of the invention as set forth in the appended claims.

What is claimed is:

1. A decentralized mass transit rider information system to reduce rider anxiety for use in a mass transit system having a route traveled by at least one mass transportation vehicle in accordance with a posted schedule and having at least one stop on said route visited by said vehicle during that schedule, comprising:

a first stationary unit for placement at a first stop, the first stationary unit having a first receiving unit, a first display unit and a first timer unit coupled to said first receiving unit; the first receiving unit, the first display unit and the first timer unit being proximally associated with said first stationary unit for placement at said first stop; the first receiving unit having means for issuing a first command signal to said first timer unit the first timer unit and first display unit being responsive to said first command signal to repeatedly measure and display a first numerical value indicative of the current elapsed time following receipt of said first command signal;

a second stationary unit for placement at a second stop, the second stationary unit having a second receiving unit, a second display unit and a second timer unit coupled to said second receiving unit; the second receiving unit, the second display unit and the second timer unit being proximally associated with said second stationary unit for placement at said second stop; the second receiving unit having means for issuing a second command signal to said second timer unit the second timer unit and second display unit being responsive to said second command signal to repeatedly measure and display a second numerical value indicative of the current elapsed time following receipt of said second command signal;

a vehicle unit for placement on said vehicle, the vehicle unit having a transmitting unit for causing said first and second receiving units to respectively issue first and second command signals to said first and second timer units when the vehicle passes in proximity to said first and second stationary units;

wherein said receiving units include means for discriminating between said first and second command signals based on the respective energy levels of said first and second command signals;

whereby the rider is provided with elapsed time information allowing the rider to estimate the arrival time of the next scheduled vehicle from the posted schedule.

2. The information system of claim 1 wherein said transmitting unit issues a uniquely coded signal and wherein said receiving unit responds only to said uniquely coded signal.

3. The information system of claim 1 wherein said transmitting unit radiates an electromagnetic signal and wherein said transmitting unit includes regulating means for controlling the radiated energy of the electromagnetic signal.

4. The information system of claim 1 wherein said receiving unit is responsive to received electromagnetic signals and wherein said receiving unit includes threshold detecting means for selectively responding to only received electromagnetic signals above a predetermined energy.

5. The information system of claim 1 further comprising a data collection station and a means coupled to said stationary unit for forwarding the displayed time elapsed to the data collection station.

6. A decentralized mass transit rider information system to reduce rider anxiety for use in a mass transit system having a route traveled by at least one mass transportation vehicle in accordance with a posted schedule and having at least one stop on said route visited by said vehicle during that schedule, comprising:

a first stationary unit for placement at a first stop, the first stationary unit having a first receiving unit, a first display unit and a first timer unit coupled to said first receiving unit; the first receiving unit, the first display unit and the first timer unit being proximally associated with said first stationary unit for placement at said first stop; the first receiving unit having means for issuing a first command signal to said first timer unit, and the first resettable timer unit having a first time of day capturing mechanism for determining and storing a first time of day in response to said first command signal;

the first timer unit and first display unit being responsive to said first command signal to repeatedly calculate from said first time of day and display a first numerical value indicative of the current elapsed time following receipt of said first command signal;

a second stationary unit for placement at a second stop, the second stationary unit having a second receiving unit, a second display unit and a second timer unit coupled to said second receiving unit; the second receiving unit, the second display unit and the second timer unit being proximally associated with said second stationary unit for placement at said second stop, the second receiving unit having a second time of day capturing mechanism for determining and storing a second time of day in response to said second command signal;

the second timer unit and second display unit being responsive to said second command signal to repeatedly calculate from said second time of day and display a second numerical value indicative of the current elapsed time following receipt of said second command signal;

a vehicle unit for placement on said vehicle, the vehicle unit having a transmitting unit for causing said receiving unit to issue a reset signal to said resettable timer unit when the vehicle passes in proximity to said stationary unit;

wherein said receiving units include means for discriminating between said first and second command signals based on the respective energy levels of said first and second command signals;

whereby the rider is provided with information regarding the time of last vehicle arrival thereby allowing the rider to estimate the arrival time of the next scheduled vehicle from the posted schedule.

7. The information system of claim 6 wherein said transmitting unit issues a uniquely coded signal and wherein said receiving unit responds only to said uniquely coded signal.

8. The information system of claim 6 wherein said transmitting unit radiates an electromagnetic signal and wherein said transmitting unit includes regulating means for controlling the radiated energy of the electromagnetic signal.

9. The information system of claim 6 wherein said receiving unit is responsive to received electromagnetic signals and wherein said receiving unit includes threshold detecting means for selectively responding to only received electromagnetic signals above a predetermined energy.

10. The information system of claim 6 further comprising a data collection station and a means coupled to said stationary unit for forwarding the displayed time of day information to the data collection station.

11. A decentralized mass transit rider information system to reduce rider anxiety for use in a mass transit system having a plurality of routes each traveled by at least one mass transportation vehicle in accordance with posted schedules and in which at least two of said routes share a common stop, comprising:

first route information station associated with a first route and located at said common stop;

second route information station associated with a second route and located at said common stop;

each of said information stations having timing system disposed at said station and responsive to a command signal for displaying information regarding the timing of last vehicle arrival at that stop;

first transmitter disposed on said vehicle of said first route having means for communicating a first command signal to the timing system of said first route information station, said first command signal being generally coincident with the arrival of said vehicle of said first route at said common stop;

second transmitter disposed on said vehicle of said second route having means for communicating a second command signal to the timing system of said second route information station, said second command signal being generally coincident with the arrival of said vehicle of said second route at said common stop;

the first and second transmitters supplying first and second command signals as differently coded signals;

whereby said receiving unit includes means for discriminating between said first command signal and said second command signal based on the respective energy levels of said first and second command signals and further based on coding differences between the first and second signals, and whereby the rider is provided with last vehicle arrival time information for both routes sharing said common stop, thereby allowing the rider to estimate the arrival time of the next scheduled vehicle from the posted schedule.

12. The information system of claim 11 wherein said transmitting unit issues a uniquely coded signal and wherein said receiving unit responds only to said uniquely coded signal.

13. The information system of claim 11 wherein said transmitting unit radiates an electromagnetic signal and wherein said transmitting unit includes regulating means for controlling the radiated energy of the electromagnetic signal.

14. The information system of claim 11 wherein said receiving unit is responsive to received electromagnetic signals and wherein said receiving unit includes threshold detecting means for selectively responding to only received electromagnetic signals above a predetermined energy.

15. The information system of claim 11 further comprising a data collection station and a means coupled to said stationary unit for forwarding the displayed time elapsed to the data collection station.

* * * * *